T. H. JONES.
TRAP.
APPLICATION FILED JULY 17, 1915.
1,182,277.
Patented May 9, 1916.
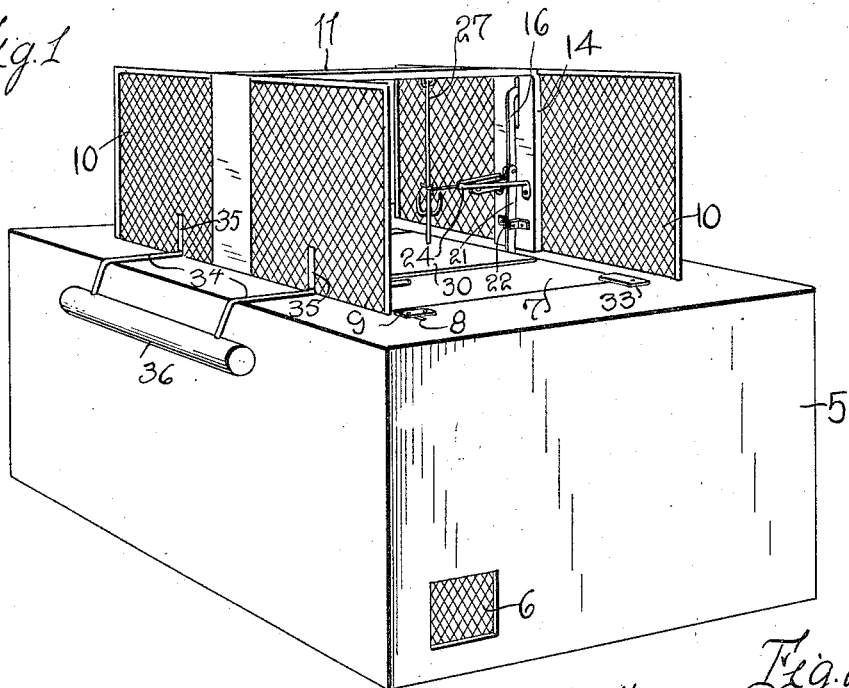
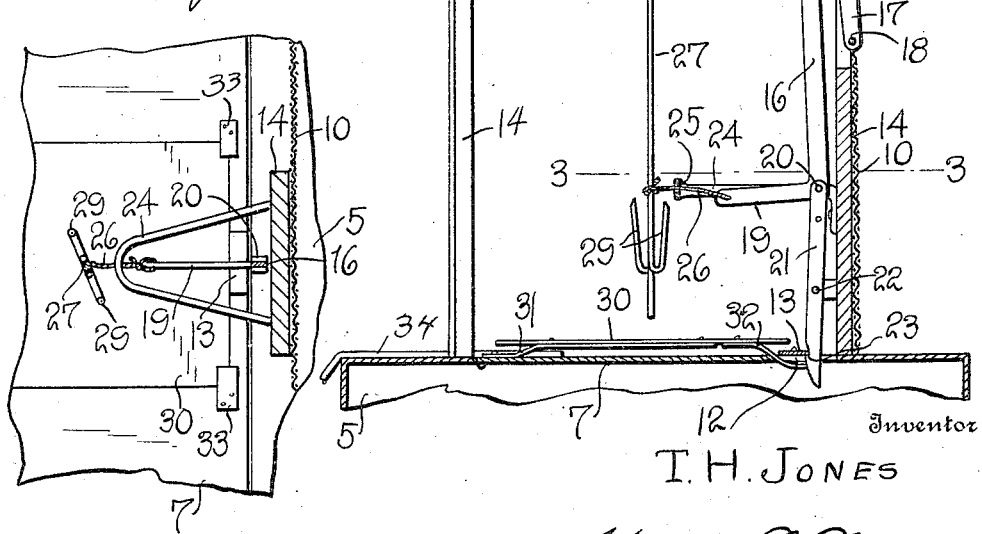
Inventor
T. H. JONES
By Watson E. Coleman
Attorney

UNITED STATES PATENT OFFICE.

TIRY H. JONES, OF LONG BEACH, CALIFORNIA.

TRAP.

1,182,277. Specification of Letters Patent. Patented May 9, 1916.

Application filed July 17, 1915. Serial No. 40,427.

*To all whom it may concern:*

Be it known that I, TIRY H. JONES, a citizen of the United States, residing at Long Beach, in the county of Los Angeles and State of California, have invented certain new and useful Improvements in Traps, of which the following is a specification, reference being had to the accompanying drawings.

This invention relates to an improved trap and more particularly to a trap for catching rats, squirrels and like animals, the invention having for its primary object to provide an improved device of this character which is so constructed that warning of the approaching danger to the animal is reduced to a minimum so that the device will be highly effective and reliable in practical operation.

The invention has for a more particular object to provide an animal trap including a box or pit having a hinged platform, latch means normally supporting the platform, a bait holder connected to the latch member, and a spring sustained trigger plate mounted on the platform also operating to move the latch to its released position when the animal treads thereon, whereby the platform will swing downwardly and the animal will be precipitated into the pit.

It is a further object of my invention to provide an animal trap having a latch mechanism for the movable platform, of exceedingly simple construction but which will be effective to sustain the movable platform and yet extremely sensitive so that it will instantaneously release the platform when the animal treads on the trigger plate or pulls upon the bait.

With the above and other objects in view, my invention consists in the novel features of construction, combination and arrangement of parts to be hereinafter more fully described, claimed and illustrated in the accompanying drawing, in which, Figure 1 is a perspective view illustrating the preferred embodiment of my trap; Fig. 2 is a vertical section of the trap; and Fig. 3 is a section taken on the line 3—3 of Fig. 2.

Referring in detail to the drawing, 5 designates the body of the trap which consists preferably of a rectangular box or pit into which the animal is precipitated. This box is preferably constructed of sheet metal and is provided in one of its end walls with air openings covered by wire gauze or other reticulated material, indicated at 6. In the top wall of the box, the platform 7 is mounted in an opening formed in said wall. This platform is provided at one of its ends and on one of its longitudinal edges with hinge pintles 8 which are seated in bearing recesses provided in the top wall of the box or body of the trap and over these recesses the plates 9 are arranged and fixed to said top wall to retain the hinge pintles in place.

Along each of the longitudinal edges of the opening in the top wall in which the platform is mounted, the vertical parallel side walls 10 are arranged, said walls being preferably constructed of wire fabric. The upper edges of these parallel walls are connected together, intermediate of their ends, by a transverse plate 11. In the free longitudinal edge of the platform 7, at the center thereof, a notch or recess 12 is formed, and over the inner end of this recess a keeper plate 13, which is fixed upon the platform, extends. Upon the inner face of one of the vertical side walls 10 an upright 14 extends and is fixed at its lower end to the top wall of the box 5 and at its upper end to the transverse plate 11. The upper end of this wall is provided with a longitudinal slot 15 through which the downwardly curved upper end 17 of a lever 16 extends. This lever is pivotally mounted upon a rod 18 extending across the slot 15 on the outer face of the upright 14. The lever 16 extends downwardly upon the inner side of the upright 14 and at its lower end is formed with the angular, inwardly projecting arm 19. This lever, at the juncture of the angular arm therewith, is pivotally connected, as shown at 20, to the upper end of a latch member 21. This latch member, at a point intermediate of its ends, is pivotally mounted between bracket ears 22 fixed to the upright 14. The lower extremity of the latch member is tapered and provided upon its inner edge with a shoulder 23 which is adapted to be engaged by the edge of the keeper plate 11 on the hinged platform 7, whereby said platform is supported in the opening of the top wall of the box 5.

A horizontally disposed U-shaped rod 24 has its extremities fixed to the inner face of the upright 14 and is provided intermediate of its ends with an opening 25 through which the flexible wire or cord 26 is movably disposed. One end of this flexible member is connected to the arm 19 of the lever 16 and the other end thereof is suitably attached to a depending bait rod 27 which is loosely mounted at its upper end in an eye 28 fixed to the transverse plate 9. The lower end of this hanging rod 27 is provided adjacent to the rod 24 with upwardly projecting hooks or prongs 29 upon which the bait is adapted to be fastened.

30 designates a trigger plate which is yieldably sustained upon the platform 7 in spaced relation thereto by means of the leaf springs 31 which are fixed at one of their ends to the platform adjacent to its hinged edge. One end of a leaf spring 32 is also fixed to the under side of the trigger plate adjacent to the relatively opposite end thereof, and the free end of this leaf spring extends beneath the metal plate 12 and engages the inclined edge of the latch member 21. At the corners of the opening in the top wall of the trap body opposite to the platform hinges, stop plates 33 are secured which limit the upward swinging movement of the platform when the same is moved to its closed position. Spaced arms 34 are fixed at one of their ends to the hinged edge of the platform and are movable in vertical slots 35 provided in one of the side walls 10. The other ends of these arms are connected by the weight element 36 which acts by gravity to return the platform to its closed position.

In the practical operation of the invention, it will be understood that the bait is properly attached to the lower end of the pendant bait rod 28, the hinged platform 7 being supported in its raised position within the opening in the top wall of the trap body by the latch member 21. When a rat or other animal treads upon the plate 30, this plate is forced downwardly against the action of the sustaining springs 31 and the spring 32 on the under side of said plate bears against the inner edge of the latch member 21 and moves the same outwardly beyond the plate 12. Thus, the hinged platform 7 is released so that it drops downwardly by gravity and the rat or other animal is precipitated into the pit or box. If, however, the animal does not place sufficient weight upon the trigger plate 30 to depress the same so that the platform is released but reaches the bait without stepping upon the trigger plate, a pull upon the bait will swing the hanging rod 28 and, through the flexible connection 26, will transmit movement to the latch element 21 through the medium of the angular arm on the lower end of the lever 16 so that said latch member is moved to its released position and the hinged platform or door will drop. After the platform has been precipitated into the box 5, the weight 36 moves downwardly by gravity and returns the platform to its normal position. In this manner, the trapping of the rat or other animal is positively assured and the device rendered highly effective and reliable in practical use.

From the foregoing description, taken in connection with the accompanying drawing, the construction and several advantages of my invention will be clearly and fully understood. As the animal may obtain a clear view longitudinally over the platform and the side walls 8 are constructed of wire fabric, there is no obstruction to the light so that the animal will not be frightened away from the trap. For catching squirrels or larger animals, it will be understood that the trap will be made in proportionately larger sizes.

The several structural features of the invention may also be variously modified as may be required in view of the particular use to which the trap is to be applied and it will, therefore, be understood that I reserve the privilege of resorting to all such legitimate changes as may fairly fall within the spirit and scope of the invention as claimed.

Having thus fully described my invention, what I desire to claim and secure by Letters Patent is:—

1. An animal trap including a pit having a top wall, a hinged trap door mounted in said wall, a pivoted latch member to support the trap door in closed position, a pendant bait receiving member, connecting means between said member and one end of the latch element whereby the trap door will be released by a pull upon the bait, and additional means mounted upon the trap door and actuated by the weight of the animal coöperating with the opposite end of the latch element to move the same and release the trap door.

2. An animal trap including a pit having a top wall, a hinged trap door mounted in said wall, a lever fulcrumed at one end for rocking movement and having an angularly disposed arm on its other end, a latch element to support the door in its closed position, said element being pivotally connected to the lever at the juncture of the arm therewith, a pendant bait holder, and a flexible connection between said bait holder and the arm of the lever whereby the latch element is moved to its released position by a pull upon the bait so that the trap door will drop and precipitate the animal into the pit.

3. An animal trap including a pit having a top wall, a trap door hingedly mounted in said top wall, a vertically disposed latch element pivoted intermediate of its ends to support said door in its closed position, a lever fulcrumed at one end for rocking movement and pivotally connected to the upper end of the latch element, a movable bait receiving member flexibly connected to the lever to actuate the latch element when the bait is pulled by the animal so that the trap door is released, a spring sustained trigger plate mounted upon the platform, and means on the under side of said plate projected into engagement with the lower end of the latch lever when the animal treads upon the plate to move said element and release the trap door so that the animal will be precipitated into the pit.

In testimony whereof I hereunto affix my signature in the presence of two witnesses.

TIRY H. JONES.

Witnesses:
ELLEN McGARRY,
W. H. HOGE.

Copies of this patent may be obtained for five cents each, by addressing the "Commissioner of Patents, Washington, D. C."